United States Patent
Pelsoeczy

(10) Patent No.: US 8,647,448 B2
(45) Date of Patent: *Feb. 11, 2014

(54) NITRATABLE STEEL PISTON RINGS AND STEEL CYLINDRICAL SLEEVES, AND CASTING METHOD FOR THE PRODUCTION THEREOF

(75) Inventor: Laszlo Pelsoeczy, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 51 days.

This patent is subject to a terminal disclaimer.

(21) Appl. No.: 13/260,437

(22) PCT Filed: Mar. 25, 2010

(86) PCT No.: PCT/EP2010/001887
§ 371 (c)(1),
(2), (4) Date: Dec. 27, 2011

(87) PCT Pub. No.: WO2010/108685
PCT Pub. Date: Sep. 30, 2010

(65) Prior Publication Data
US 2012/0090462 A1    Apr. 19, 2012

(30) Foreign Application Priority Data
Mar. 26, 2009 (DE) .......... 10 2009 015 008

(51) Int. Cl.
*C22C 38/34* (2006.01)
*C22C 38/46* (2006.01)
*C21D 9/00* (2006.01)
*C21D 9/40* (2006.01)
*C23C 8/26* (2006.01)

(52) U.S. Cl.
USPC ........... 148/325; 148/327; 148/318; 148/542; 148/607; 148/663; 148/230; 420/50; 420/51

(58) Field of Classification Search
USPC ......... 148/318, 225–232, 325, 419, 442, 327, 148/542, 607, 663; 420/50, 51, 117, 118, 420/586.1
See application file for complete search history.

(56) References Cited

U.S. PATENT DOCUMENTS

| | | |
|---|---|---|
| 3,990,892 A | 11/1976 | Machi et al. |
| 5,081,760 A | 1/1992 | Kikuhara et al. |
| 2006/0191508 A1 * | 8/2006 | Otsuka et al. .............. 123/193.6 |

FOREIGN PATENT DOCUMENTS

| | | |
|---|---|---|
| DE | 10 2006 038670 A1 | 2/2008 |
| EP | 095111 A | 12/1988 |

(Continued)

OTHER PUBLICATIONS

ASM International Materials Park, Ohio, Metallographer's Guide: Practices and Procedures for Irons & Steels, Chapter 1, "Introduction to Steels and Cast Iron," p. 3, Table 1.1, 1999.*

*Primary Examiner* — Deborah Yee
(74) *Attorney, Agent, or Firm* — Robert L. Stearns; Dickinson Wright, PLLC

(57) ABSTRACT

A steel piston ring and a steel cylinder liner are described which comprise as the main body a steel composition which has good nitridability. The steel composition consists of the following elements: 0-0.5 weight % B, 0.5-1.2 weight % C, 4.0-20.0 weight % Cr, 0-2.0 weight % Cu, 45.30-91.25 weight % Fe, 0.1-3.0 weight % Mn, 0.1-3.0 weight % Mo, 0-0.05 weight % Nb, 2.0-12.0 weight % Ni, 0-0.1 weight % P, 0-0.05 weight % Pb, 0-0.05 weight % S, 2.0-10.0 weight % Si, 0-0.05 weight % Sn, 0.05-2.0 weight % V, 0-0.2 weight % Ti and 0-0.5 weight % W. The steel piston ring and the steel cylinder liner can be manufactured in a casting process using the machinery and technology employed for the manufacture of cast iron parts.

22 Claims, 1 Drawing Sheet

(56) References Cited

FOREIGN PATENT DOCUMENTS

| | | | |
|---|---|---|---|
| JP | 59-104458 A | * | 6/1984 |
| JP | 1205063 A | | 8/1989 |
| JP | 3122257 A | | 5/1991 |
| JP | 5132738 A | | 5/1993 |
| JP | 2001-279369 | * | 10/2001 |
| WO | WO 03/098079 A | | 11/2003 |

* cited by examiner

NITRATABLE STEEL PISTON RINGS AND STEEL CYLINDRICAL SLEEVES, AND CASTING METHOD FOR THE PRODUCTION THEREOF

BACKGROUND OF THE INVENTION

1. Technical Field

The present invention relates to piston rings and cylinder liners which have good nitridability and can be manufactured in a casting process. Furthermore, the present invention relates to nitrided piston rings and cylinder liners which can be manufactured from the piston rings and cylinder liners with good nitridability of the invention. In addition, the present invention relates to a process for the manufacture of the piston rings and cylinder liners with good nitridability of the invention and to a process for the manufacture of nitrided piston rings and cylinder liners in accordance with the invention.

2. Related Art

In an internal combustion engine, piston rings seal the gap between the piston head and the cylinder wall of the combustion chamber. As the piston moves back and forth, one side of the piston ring slides with its outer circumferential surface against the cylinder wall in a permanently spring-loaded position, and because of the tilting movements of the piston, the other side of the piston ring slides in an oscillating manner in its piston ring groove, whereupon its flanks bear alternately on upper or lower groove flanks of the piston ring groove. The mutual sliding of these components against each other results in a greater or lesser amount of wear, depending on the material; if it runs dry, this can lead to so-called fretting, scoring and finally destruction of the engine. In order to improve the slide and wear behaviour of the piston rings against the cylinder wall, their circumferential surface has been provided with coatings formed from various materials.

Cylinder liners, such as those in reciprocating piston internal combustion engines, must have high wear resistance as otherwise, i.e. as the cylinder liner becomes thinner, gas leakage and oil consumption can increase and the performance of the engine deteriorates. As a cylinder liner abrades, the play in the piston rings increases steadily so that more combustion gas gains ingress into the crankcase. Further, in extreme cases, the piston ring might no longer bear evenly on the cylinder liner and then even more gas can gain ingress into the crankcase.

In order to produce high performance internal combustion engine parts, such as piston rings and cylinder liners, cast iron materials or cast iron alloys are usually used. In high performance engines, the requirements placed on piston rings, in particular compression rings, are becoming ever more stringent, for example as regards peak compressive pressure, combustion temperature, EGR and lubricant film reduction, which substantially affect their functional properties such as wear, scorch resistance, micro-welding and corrosion resistance.

Prior art cast iron materials, however, are at great risk of breaking; in fact, when using current materials, the rings frequently break. Increased mechanico-dynamic loads result in shorter service lifetimes for piston rings and cylinder liners. Severe wear and corrosion occurs on the running faces and flanks.

Higher ignition pressures, reduced emissions and direct fuel injection mean increased loads on the piston rings. This results in damage and a build-up of piston material, especially on the lower piston ring flank.

Because of the higher mechanical and dynamic stresses on piston rings and cylinder liners, more and more engine manufacturers are demanding piston rings and cylinder liners from high-grade steel (hardened and tempered and high alloy, such as grade 1.4112, for example). Ferrous materials containing less than 2.08 weight % of carbon are herein known as steel. If the carbon content is higher, it is known as cast iron. Compared with cast iron, steels have better strength and toughness properties as there is no interference from free graphite in the basic microstructure.

Usually, high chrome alloyed martensitic steels are used for the manufacture of steel piston rings or steel cylinder liners. However, using such steels suffers from the disadvantage that the manufacturing costs are significantly higher than those of cast iron components.

Steel piston rings are manufactured from profiled wire. The profiled wire is coiled into a circular shape, cut and pulled over a "non-round" mandrel. The piston ring attains its desired non-round shape on this mandrel by means of an annealing process, which imparts the required tangential forces. A further disadvantage of the manufacture of piston rings from steel is that beyond a certain diameter, ring manufacture (coiling) from steel wire is no longer possible.

A conventional steel piston ring is disclosed in EP 0 295 111 A2. It consists of an alloy with added aluminium to facilitate manufacture of the profiled wire and to facilitate further processing to form the piston ring.

Piston rings formed from cast iron, on the other hand, are already non-round when cast, so that from the outset they have an ideal shape. Cast iron has a substantially lower melting point than steel. The difference may be up to 350° C., depending on the chemical composition. Thus, cast iron is easier to melt and to cast, since a lower melting point means the casting temperature is lower and thus the shrinkage on cooling is smaller, and so the cast material has fewer pipe defects or heat and cold cracking. A lower casting temperature also results in a lower stress on the material of the mould (erosion, gas porosity, sand inclusions) and the furnace and also results in lower melting costs.

The melting point of a ferrous material does not simply depend on the carbon content, but also on its "degree of saturation". The following empirical formula applies:

$$S_c = C/(4.26 - \tfrac{1}{3}(Si+P))$$

The closer the degree of saturation is to 1, the lower is the melting point. For cast iron, a degree of saturation of 1.0 is usually desirable, whereupon the cast iron has a melting point of 1150° C. The degree of saturation of steel is approximately 0.18, depending on the chemical composition. Eutectic steel has a melting point of 1500° C.

The degree of saturation can be substantially influenced by the Si or P content. As an example, a 3 weight % higher silicon content has a similar effect to a 1 weight % higher C content. Thus, it is possible to manufacture a steel with a C content of 1 weight % and 9.78 weight % silicon content which has the same melting point as cast iron with a degree of saturation of 1.0 (C: 3.26 weight %; Si: 3.0 weight %).

A drastic increase in the Si content can raise the degree of saturation of the steel and reduce the melting point to that for cast iron. Thus, it is possible to manufacture steel with the aid of the same technology that is used for the manufacture of cast iron, for example GOE 44.

Piston rings and cylinder liners formed from high silicon cast steel are known in the art. However, the silicon present in larger quantities has a negative influence on the hardenability of the material since its austenite transition temperature, "Ac3", is increased.

Steel piston rings with low silicon contents are, however, conventionally manufactured from profiled wire. Such a steel piston ring with a low silicon content is described in JP 03-122257A.

A process that is normal in the art for nevertheless increasing the hardness of the piston ring surface could consist in nitriding the material. However, it has been shown that prior art high silicon steel castings have poor nitridability.

SUMMARY OF THE INVENTION

Thus, the aim of the invention is to provide steel piston rings and steel cylinder liners with a main body formed from a high silicon content steel composition and which have good nitridability, as well as the provision of nitrided piston rings and cylinder liners. Upon manufacture by gravity casting, the properties of the nitrided steel composition of the nitrided piston rings and cylinder liners should surpass the properties of hardened and tempered spheroidal graphite cast iron in at least one of the following points:

mechanical properties such as elastic modulus, bending strength;

break strength;

form stability;

wear on the flanks;

wear on the running surfaces.

In accordance with the invention, this aim is achieved by means of steel piston rings and steel cylinder liners having a main body formed from a steel composition which contains the following elements in the following proportions:

| | | |
|---|---|---|
| B: | 0-0.5 | weight % |
| C: | 0.5-1.2 | weight % |
| Cr: | 4.0-20.0 | weight % |
| Cu: | 0-2.0 | weight % |
| Fe: | 45.30-91.25 | weight % |
| Mn: | 0.1-3.0 | weight % |
| Mo: | 0.1-3.0 | weight % |
| Nb: | 0-0.05 | weight % |
| Ni: | 2.0-12.0 | weight % |
| P: | 0-0.1 | weight % |
| Pb: | 0-0.05 | weight % |
| S: | 0-0.05 | weight % |
| Si: | 2.0-10.0 | weight % |
| Sn: | 0-0.05 | weight % |
| Ti: | 0-0.2 | weight % |
| V: | 0.05-2.0 | weight % |
| W: | 0-0.5 | weight % |

It is assumed that the good nitridability of the piston rings and cylinder liners of the invention is due to the 4.0-20.0 weight % chromium content. In the nitriding process, chromium forms very hard nitrides. While adding chromium to a steel composition would normally raise the austenite transition temperature of the material further and thus would cause its hardenability to deteriorate further, in the present invention it was observed that adding 2.0-12.0 weight % of nickel counteracts this rise in the austenite transition temperature. In this manner, the invention prevents an increase in the austenite transition temperature from nullifying the better hardenability of the surface of the material obtainable because of the improved nitridability of the steel composition by means of a simultaneous reduction in the hardenability of the main body.

Alternatively, the steel composition has the following composition:

| | | |
|---|---|---|
| B: | 0-0.5 | weight % |
| C: | 0.5-0.95 | weight % |
| Cr: | 11.0-14.5 | weight % |
| Cu: | 0-2.0 | weight % |
| Fe: | 72.055-84.550 | weight % |
| Mn: | 0.1-1.0 | weight % |
| Mo: | 0.2-1.0 | weight % |
| Nb: | 0-0.05 | weight % |
| Ni: | 1.5-3.0 | weight % |
| P: | 0-0.055 | weight % |
| Pb: | 0-0.05 | weight % |
| S: | 0-0.04 | weight % |
| Si: | 2.6-4.0 | weight % |
| Sn: | 0-0.05 | weight % |
| Ti: | 0-0.2 | weight % |
| V: | 0.05-0.15 | weight % |
| W: | 0-0.4 | weight % |

In order to increase the degree of saturation of the steel employed, in both alternatives, the silicon content of the steel is preferably at least 3.0 weight %.

Furthermore, the steel composition preferably contains at least 0.003 weight % of lead, at least 0.003 weight % of copper, at least 0.003 weight % of phosphorus and at least 0.003 weight % of sulphur.

Preferably, the steel piston ring of the invention has a dendtritic microstructure. Conventional steel piston rings manufactured from a profiled wire have a finely divided microstructure with no dendrites. In some conventional steel piston rings, however, the drawing or rolling direction of the profiled wire can still be detected in the microstructure.

Nitriding the steel piston rings or steel cylinder liners with good nitridability of the invention produces nitrided steel piston rings or steel cylinder liners in accordance with the invention.

The nitrided steel piston rings and steel cylinder liners of the invention have a reduced tendency to change their shape when heated strongly, and thus provide long-term high performance and, moreover, reduced oil consumption.

The nitrided steel piston rings and steel cylinder liners of the invention also have the advantage that they can be manufactured using machinery and technology for manufacturing cast iron parts. In addition, the manufacturing costs correspond to those of cast iron piston rings or grey cast iron cylinder liners, providing cost savings for the manufacturer and improving margins. Similarly, the material parameters can be adjusted independently of the supplier.

The invention also provides a process for the manufacture of steel piston rings and steel cylinder liners with good nitridability in accordance with the invention, comprising the following steps:

a. producing a molten mass from the starting materials; and b. casting the molten mass into a prepared mould.

This produces steel piston rings and steel cylinder liners with dendritic microstructures. As an example, in contrast, the conventional manufacture of steel piston rings from a profiled wire produces piston rings with a finely divided microstructure.

Examples of starting materials are steel scrap, return scrap and alloying substances. The melting process is carried out in a furnace, preferably a smelting furnace, particularly preferably in a cupola furnace. Next, a blank is produced when the melt solidifies. In prior art processes, the steel piston ring or the steel cylinder liner can be cast, such as for example centrifugal casting processes (a preferred method for the manufacture of cylinder liners), continuous casting processes, die stamping processes, Croning processes or, as is preferable, green sand moulding.

After the piston ring or cylinder liner has cooled, the mould is emptied and the blank obtained is cleaned.

If necessary, the piston ring or the cylinder liner may then be quenched and tempered. The following steps accomplish this:

c. austenitization of the piston ring or the cylinder liner above its Ac3 temperature;
d. quenching the piston ring or the cylinder liner in a suitable quenching medium; and
e. tempering the piston ring or the cylinder liner at a temperature in the range 400° C. to 700° C. in a controlled atmosphere furnace.

Preferably, oil is used as the quenching medium.

In order to manufacture a nitrided piston ring or a cylinder liner in accordance with the invention, following the process steps mentioned above, nitriding of the piston ring or the cylinder liner obtained is carried out. This can, for example, be accomplished by gas nitriding, plasma nitriding or pressure nitriding.

THE DRAWINGS

The following example and the figures illustrate the invention without limiting it.

DETAILED DESCRIPTION

EXAMPLE

Figure 1:
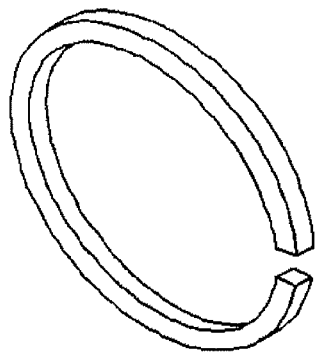
FIG. 1 shows a diagrammatic drawing of a piston ring in accordance with the invention.

A piston ring (see FIG. 1) was manufactured from a highly nitridable steel composition in accordance with the invention having the following composition:

| B:  | 0.001 weight % |
|-----|----------------|
| C:  | 0.8 weight %   |
| Cr: | 13.0 weight %  |
| Cu: | 0.05 weight %  |
| Mn: | 0.3 weight %   |
| Mo: | 0.5 weight %   |
| Nb: | 0.002 weight % |
| Ni: | 2.1 weight %   |
| P:  | 0.041 weight % |
| Pb: | 0.16 weight %  |
| S:  | 0.009 weight % |
| Si: | 3.0 weight %   |
| Sn: | 0.001 weight % |
| Ti: | 0.003 weight % |
| V:  | 0.11 weight %  |
| W:  | 0.003 weight % |
| Fe: | remainder      |

It was obtained by producing a molten mass from the starting materials (steel scrap, return scrap and alloying substances) and casting the melt into a prepared green sand mould. Next, the mould was emptied and the piston ring obtained was cleaned. The piston ring was then quenched and tempered. This was accomplished by austenitization above the Ac3 temperature of the steel composition, quenching in oil and tempering at a temperature in the range 400° C. to 700° C. in a controlled atmosphere furnace.

Finally, the surface of the piston ring obtained was nitrided. Although the hardness before nitriding was 420 HV or 42 HRC, in the nitrided regions a hardness of more than 1000 HV was obtained, which guarantees a high resistance to flank wear and running face wear. The hardness in this case was determined in accordance with DIN EN 10109-1 and DIN EN 10008-1. The modulus of elasticity of the piston ring of the invention was 215000 MPa.

Figure 2:
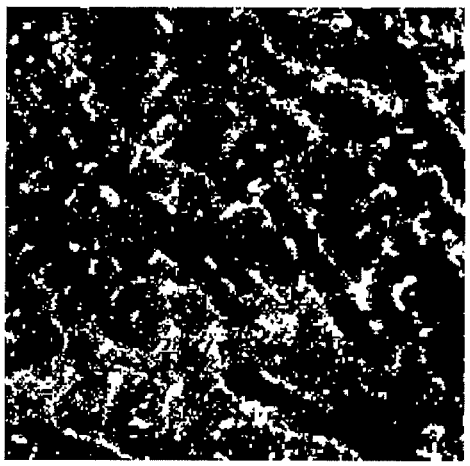
FIG. 2 shows a magnified section (500:1) of the basic microstructure of a steel piston ring in accordance with the invention.
Figure 3:
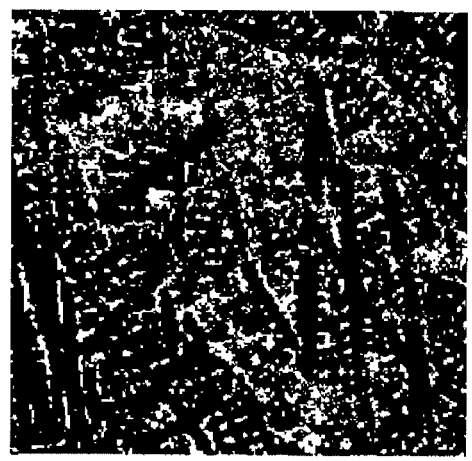
FIG. 3 shows a magnified section (200:1) of the basic microstructure of a steel piston ring in accordance with the invention.
Figure 4:
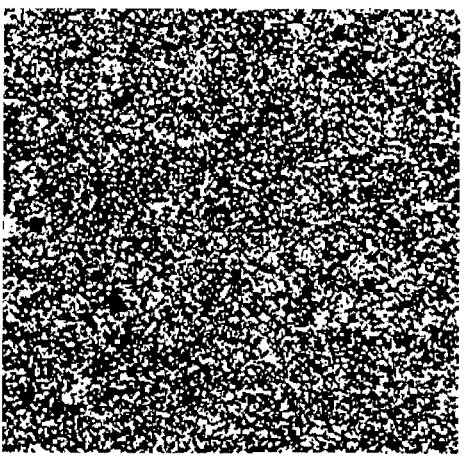
FIG. 4 shows a magnified section (500:1) of the basic microstructure of a conventional steel piston ring.

Magnified sections of the basic microstructure of the cast steel piston ring of the invention are shown in FIG. 2 (500:1) and FIG. 3 (200:1). For comparison, FIG. 3 shows the basic microstructure of a conventionally manufactured steel piston ring at the same magnification (GOE 65 D cast iron from Federal Mogul; chemical composition: 0.05-0.75 weight % C, 11.0-15.0 weight % Cr, max. 1.0 weight % Mn, max 0.6 weight % Mo, max 0.045 weight % P, max 1.0 weight % Si, max 0.1 weight % V). It can be seen that the steel piston ring of the invention has a dendritic basic microstructure. The white regions identify chromium carbides, which have precipitated out at grain boundaries along the dendrites. In contrast, the conventional steel piston ring has a finely divided microstructure with no dendrites. Not even the drawing or rolling direction of the piston ring can be seen.

The invention claimed is:

1. A steel component selected from either a piston ring or a cylinder liner and fabricated of a steel composition consisting of:

| B:  | 0-0.5 weight %    |
|-----|-------------------|
| C:  | 0.95-1.2 weight % |
| Cr: | 11.0-14.5 weight %|
| Cu: | 0-2.0 weight %    |
| Mn: | 0.1-3.0 weight %  |
| Mo: | 0.1-3.0 weight %  |
| Nb: | 0-0.002 weight %  |
| Ni: | 1.5-3.0 weight %  |
| P:  | 0-0.1 weight %    |
| Pb: | 0-0.05 weight %   |
| S:  | 0-0.05 weight %   |
| Si: | 4.0-10.0 weight % |
| Sn: | 0-0.05 weight %   |
| Ti: | 0-0.2 weight %    |
| V:  | 0.05-2.0 weight % |
| W:  | 0-0.5 weight %    | and the remainder being Fe.

2. A steel component selected from either a piston ring or a cylinder liner and fabricated of a steel composition consisting of:

| B:  | 0-0.5 weight %         |
|-----|------------------------|
| C:  | 0.5-0.95 weight %      |
| Cr: | 11.0-14.5 weight %     |
| Cu: | 0-2.0 weight %         |
| Fe: | 72.055-84.550 weight % |
| Mn: | 0.1-1.0 weight %       |
| Mo: | 0.2-1.0 weight %       |
| Nb: | 0-0.002 weight %       |
| Ni: | 1.5-3.0 weight %       |
| P:  | 0-0.055 weight %       |
| Pb: | 0-0.05 weight %        |
| S:  | 0-0.04 weight %        |
| Si: | 4.0-10.0 weight %      |

-continued

| | |
|---|---|
| Sn: | 0-0.05 weight % |
| Ti: | 0-0.2 weight % |
| V: | 0.05-0.15 weight % |
| W: | 0-0.4 weight %. |

3. The component of claim 1, wherein the steel composition contains at least 0.003 weight % of lead, at least 0.003 weight % of copper, at least 0.003 weight % of phosphorus and at least 0.003 weight % of sulphur.

4. The component of claim 1, wherein the steel composition has a dendritic microstructure.

5. A component of claim 1, wherein the component is nitrided.

6. A process for the manufacture of a steel component selected from either a piston ring or a steel cylinder liner, comprising the following steps:
   a. producing a molten mass from a steel composition consisting of

| | |
|---|---|
| B: | 0-0.5 weight % |
| C: | 0.95-1.2 weight % |
| Cr: | 11.0-14.5 weight % |
| Cu: | 0-2.0 weight % |
| Fe: | 45.30-91.25 weight % |
| Mn: | 0.1-3.0 weight % |
| Mo: | 0.1-3.0 weight % |
| Nb: | 0.05-0.002 weight % |
| Ni: | 1.5-3.0 weight % |
| P: | 0-0.1 weight % |
| Pb: | 0-0.05 weight % |
| S: | 0-0.05 weight % |
| Si: | 4.0-10.0 weight % |
| Sn: | 0-0.05 weight % |
| Ti: | 0-0.2 weight % |
| V: | 0.05-2.0 weight % |
| W: | 0-0.5 weight % |
| | and the remainder being Fe | b. casting the molten mass into a prepared mold.

7. The process according to claim 6, wherein the melt is produced in a smelt furnace.

8. The process according to claim 6, wherein the mold is a green sand mold.

9. The process according to claim 6, wherein the steel component is the cylinder liner and the steel cylinder liner is manufactured by centrifugal casting.

10. The process according to claim 6, including the further steps of:
   c. austenitizing the steel component above its Ac3 temperature;
   d. quenching the steel component in a quenching medium; and
   e. tempering the steel component at a temperature in the range 400° C. to 700° C. in a controlled atmosphere furnace.

11. The process according to claim 6, further including: nitriding the steel piston ring or the steel cylinder liner obtained.

12. The process according to claim 11, wherein the nitriding is carried out by gas nitriding, plasma nitriding or pressure nitriding.

13. The component of claim 2, wherein the steel composition contains at least 0.003 weight % of lead, at least 0.003 weight % of copper, at least 0.003 weight % of phosphorus and at least 0.003 weight % of sulphur.

14. The component of claim 2, wherein the steel composition has a dendritic microstructure.

15. A component of claim 2, wherein the component is nitrided.

16. A process for the manufacture of a steel component selected from either a piston ring or a steel cylinder liner, comprising the following steps:
   a. producing a molten mass from a steel composition consisting of

| | |
|---|---|
| B: | 0-0.5 weight % |
| C: | 0.95-1.2 weight % |
| Cr: | 11.0-14.5 weight % |
| Cu: | 0-2.0 weight % |
| Fe: | 72.055-84.550 weight % |
| Mn: | 0.1-1.0 weight % |
| Mo: | 0.2-1.0 weight % |
| Nb: | 0-0.002 weight % |
| Ni: | 1.5-3.0 weight % |
| P: | 0-0.055 weight % |
| Pb: | 0-0.05 weight % |
| S: | 0-0.04 weight % |
| Si: | 4.0-10.0 weight % |
| Sn: | 0-0.05 weight % |
| Ti: | 0-0.2 weight % |
| V: | 0.05-0.15 weight % |
| W: | 0-0.4 weight %; | and
   b. casting the molten mass into a prepared mold.

17. The process according to claim 16 wherein the melt is produced in a smelt furnace.

18. The process according to claim 16, wherein the mold is a green sand mold.

19. The process according to claim 16, wherein the steel component is the cylinder liner and the steel cylinder liner is manufactured by centrifugal casting.

20. The process according to claim 16, including the further steps of:
   c. austenitizing the steel component above its Ac3 temperature;
   d. quenching the steel component in a quenching medium; and
   e. tempering the steel component at a temperature in the range 400° C. to 700° C. in a controlled atmosphere furnace.

21. The process according to claim 16, further including: nitriding the steel piston ring or the steel cylinder liner obtained.

22. The process according to claim 21, wherein the nitriding is carried out by gas nitriding, plasma nitriding or pressure nitriding.

* * * * *

UNITED STATES PATENT AND TRADEMARK OFFICE
CERTIFICATE OF CORRECTION

| | | |
|---|---|---|
| PATENT NO. | : 8,647,448 B2 | Page 1 of 1 |
| APPLICATION NO. | : 13/260437 | |
| DATED | : February 11, 2014 | |
| INVENTOR(S) | : Pelsoeczy | |

It is certified that error appears in the above-identified patent and that said Letters Patent is hereby corrected as shown below:

In the Claims

| Column | Line | |
|---|---|---|
| 6 | 57 | "C: 0.5-0.95 weight %" should read "C: .95-1.2 weight %" |
| Claim 2 | | |

Signed and Sealed this
Twenty-second Day of July, 2014

Michelle K. Lee
*Deputy Director of the United States Patent and Trademark Office*